(12) United States Patent
Sha (10) Patent No.: US 10,142,568 B2
(45) Date of Patent: Nov. 27, 2018

(54) METHODS AND APPARATUS FOR VIGNETTE AND OUT-OF-FOCUS CORRECTION

(71) Applicant: SEMICONDUCTOR COMPONENTS INDUSTRIES, LLC, Phoenix, AZ (US)

(72) Inventor: Yu Sha, Asaka (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 15/430,649

(22) Filed: Feb. 13, 2017

(65) Prior Publication Data

US 2018/0234647 A1    Aug. 16, 2018

(51) Int. Cl.
| | |
|---|---|
| H04N 5/357 | (2011.01) |
| H04N 5/225 | (2006.01) |
| G02B 27/64 | (2006.01) |
| G02B 7/09 | (2006.01) |

(52) U.S. Cl.
CPC ............ *H04N 5/3572* (2013.01); *G02B 7/09* (2013.01); *G02B 27/646* (2013.01); *H04N 5/2254* (2013.01)

(58) Field of Classification Search
CPC ...... H04N 5/3572; H04N 5/2254; G02B 7/09; G02B 27/646
See application file for complete search history.

(56) References Cited

U.S. PATENT DOCUMENTS

| | | | | |
|---|---|---|---|---|
| 7,123,292 | B1 * | 10/2006 | Seeger | ............... G03B 5/02 348/218.1 |
| 2002/0054217 | A1 * | 5/2002 | Matsuda | ............... H04N 1/195 348/218.1 |
| 2002/0172432 | A1 * | 11/2002 | Pilu | ............... H04N 1/40093 382/274 |
| 2006/0222260 | A1 * | 10/2006 | Sambongi | ............... G06T 5/006 382/274 |
| 2006/0269155 | A1 | 11/2006 | Tener | |
| 2008/0158417 | A1 | 7/2008 | Living | |
| 2008/0186402 | A1 | 8/2008 | Living | |
| 2009/0128636 | A1 * | 5/2009 | Wakagi | ............... H04N 5/23254 348/208.1 |
| 2012/0038794 | A1 * | 2/2012 | Kumagai | ............... H04N 5/3572 348/234 |

(Continued)

FOREIGN PATENT DOCUMENTS

| | | |
|---|---|---|
| JP | 2008-252648 A | 10/2008 |
| JP | 2009-124661 A | 6/2009 |
| JP | 2010-239514 A | 10/2010 |

*Primary Examiner* — Nicholas G Giles
(74) *Attorney, Agent, or Firm* — The Noblitt Group, PLLC; Hettie L. Haines (57) ABSTRACT

Various embodiments of the present technology may comprise a method and apparatus for vignette and out-of-focus correction. The method and apparatus may be configured to reposition an adjustable lens during a series of image captures to direct light to the center and the outer edges and/or corners of the image sensor to focus various areas of an object and/or scene. The method and apparatus may further substitute image data from a first image capture with image data from subsequent image captures.

19 Claims, 11 Drawing Sheets

(56) References Cited

U.S. PATENT DOCUMENTS

| | | | |
|---|---|---|---|
| 2014/0293035 A1* | 10/2014 | Horie | G02B 21/367 348/79 |
| 2015/0049218 A1* | 2/2015 | Fu | H04N 5/23229 348/239 |
| 2016/0124209 A1* | 5/2016 | Arai | H04N 1/401 348/80 |
| 2016/0344935 A1* | 11/2016 | Ardo | H04N 5/23248 |

* cited by examiner

METHODS AND APPARATUS FOR VIGNETTE AND OUT-OF-FOCUS CORRECTION

BACKGROUND OF THE TECHNOLOGY

Electronic devices, such as cellular telephones, cameras, and computers, commonly use image sensors to capture images. A typical CMOS (complementary metal-oxide-semiconductor) imager circuit includes a focal plane array of pixels, and each pixel includes a photo-sensor, such as a photogate or photodiode, for accumulating photo-generated charge in a portion of the substrate.

Figure 3A:
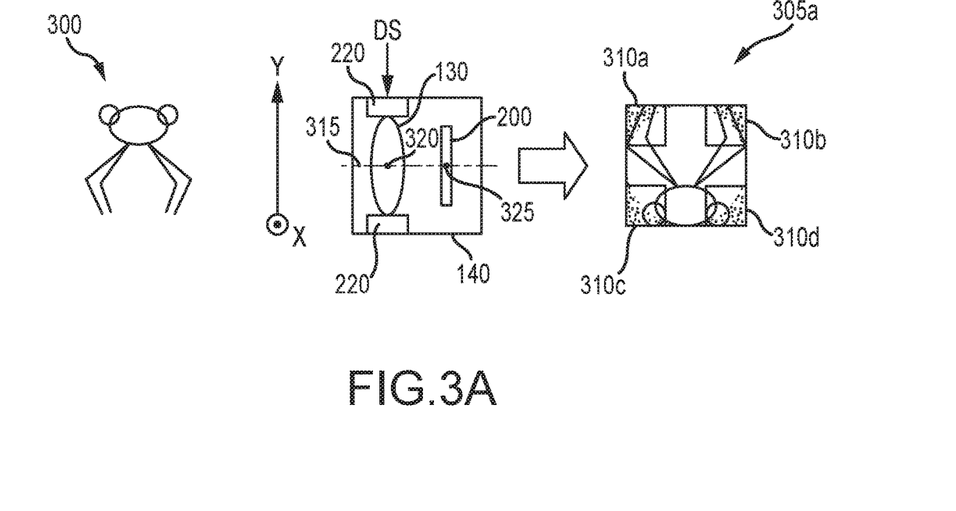
FIGS. 3A-B representatively illustrates lens positions and resulting image captures with vignetting in accordance with an exemplary embodiment of the present technology.
Figure 3B:
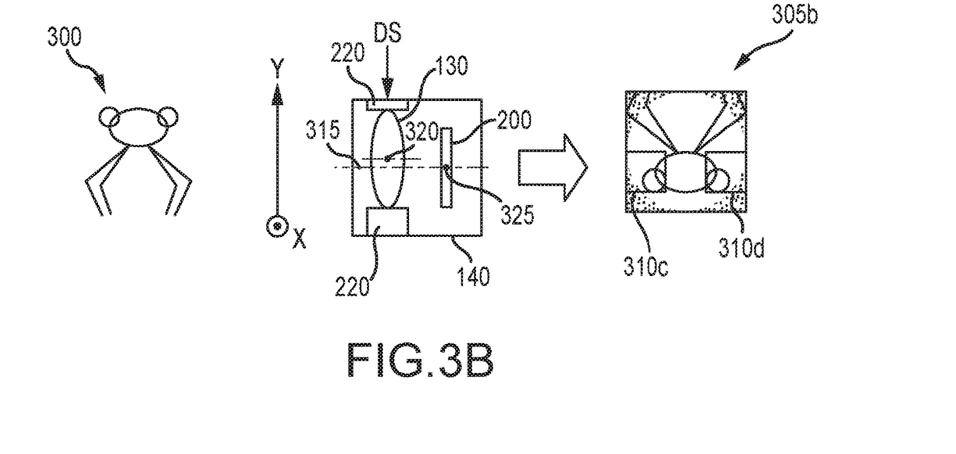

Digital imaging devices may produce an image with vignetting (darkening) and/or out-of-focus regions at corners and/or edges of an image, compared to the image center, for example as illustrated in FIGS. 3A and 3B. Vignetting is often an unintended and undesired effect caused by the lighting conditions of a scene, camera settings, and/or lens limitations, such as the f-number, the type of lens (e.g., wide angle lens), aperture diameter, lens defects, and/or mechanical issues. Mechanical vignetting occurs when light is partially blocked by external objects, such as thick or stacked filters, secondary lens, and/or improper lens hoods. Optical vignetting is caused by light hitting the lens aperture at a strong angle—an internal physical obstruction. This effect is often noticeable in images taken with wide angle lenses and wide open apertures. Natural vignetting, is caused by the light reaching different locations on the image sensor at different angles. This type of vignetting is most noticeable with wide angle lenses.

SUMMARY OF THE INVENTION

Various embodiments of the present technology may comprise a method and apparatus for vignette and out-of-focus correction. The method and apparatus may be configured to reposition an adjustable lens during a series of image captures to direct light to the center and the outer edges and/or corners of the image sensor to focus various areas of an object and/or scene. The method and apparatus may further substitute image data from a first image capture with image data from subsequent image captures.

BRIEF DESCRIPTION OF THE DRAWING FIGURES

A more complete understanding of the present technology may be derived by referring to the detailed description when considered in connection with the following illustrative figures. In the following figures, like reference numbers refer to similar elements and steps throughout the figures.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various sampling circuits, analog-to-digital converters, semiconductor devices, such as transistors, capacitors, image processing units, and the like, which may carry out a variety of functions. In addition, the present technology may be practiced in conjunction with any number of systems, such as automotive, aerospace, medical, scientific, surveillance, and consumer electronics, and the systems described are merely exemplary applications for the technology. Further, the present technology may employ any number of conventional techniques for capturing image data, sampling image data, processing image data, and the like.

Figure 1:
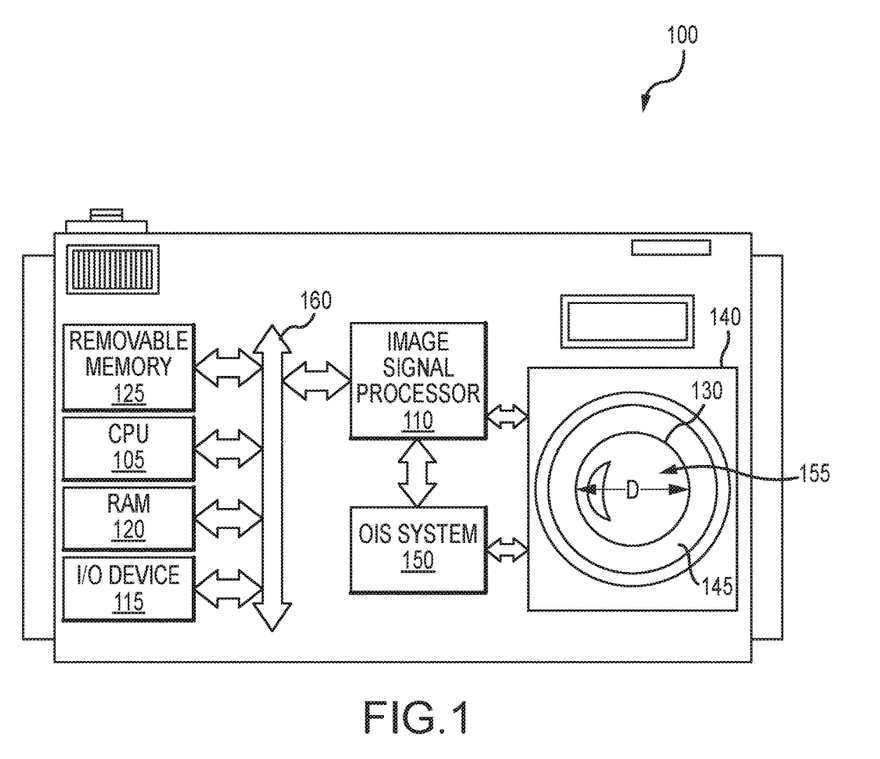
FIG. 1 representatively illustrates an imaging system in accordance with an exemplary embodiment of the present technology.
Figure 2:
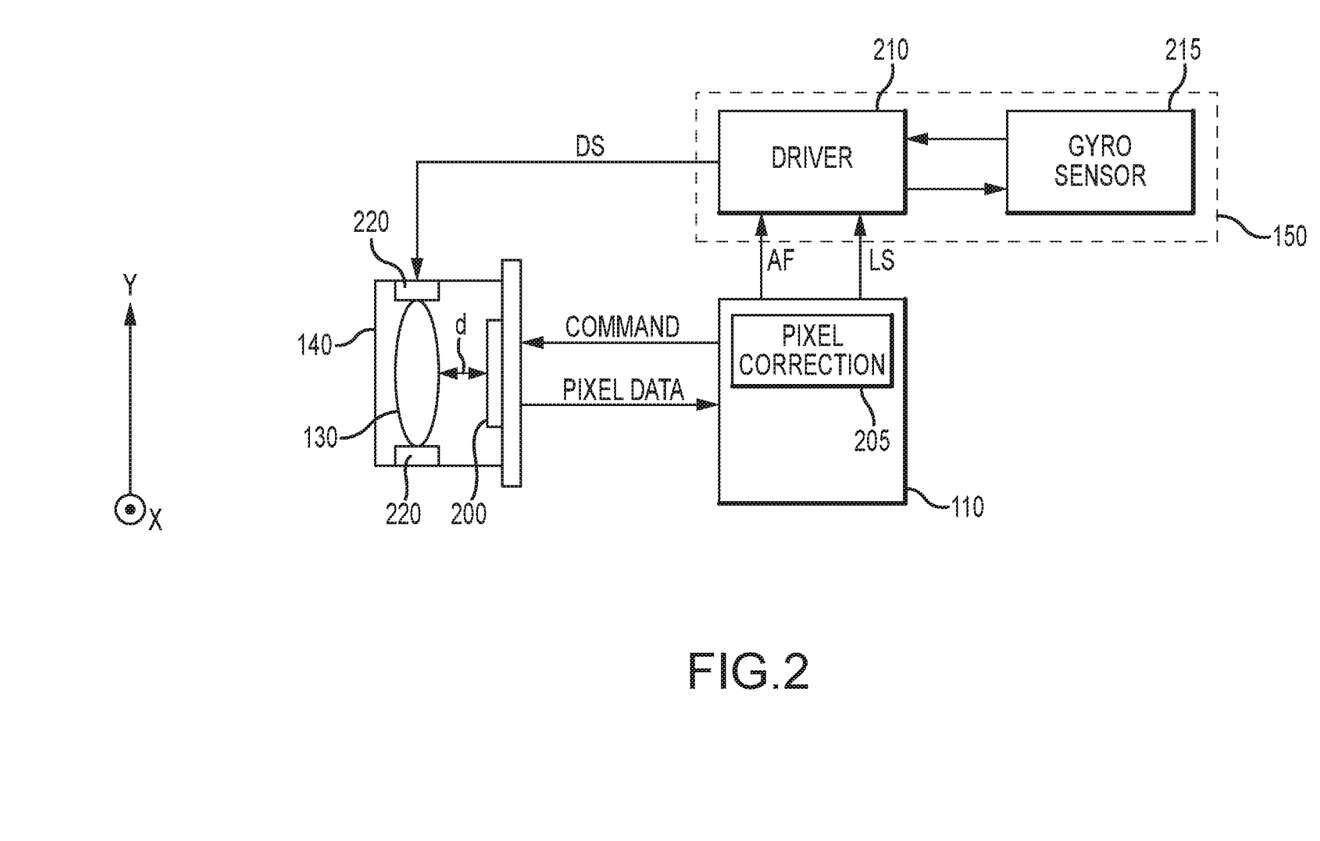
FIG. 2 is a block diagram of a vignette and out-of-focus correction system in accordance with an exemplary embodiment of the present technology.

Methods and apparatus for vignette and out-of-focus correction according to various aspects of the present technology may operate in conjunction with any suitable electronic system, such as imaging systems, "smart devices," wearables, consumer electronics, and the like. Referring to FIGS. 1 and 2, an exemplary system may be incorporated into an electronic device having an image capturing system, such as a digital camera 100 or portable computing device. In one embodiment, the system may comprise a central processing unit (CPU) 105 that communicates with various devices over a bus 160. Some of the devices connected to the bus 160 may provide communication into and out of the system, for example an input/output (I/O) device 115. Other devices connected to the bus 160 provide memory, for example a random access memory (RAM) 120, hard drive, and one or more memory devices 125, such as a USB drive, memory card, and SD card. While the bus 160 is illustrated as a single bus, any number of busses may be used to provide communication paths to interconnect the devices. In various embodiments, the system may further comprise suitable devices or systems for capturing image data, processing image data, and performing optical image stabilization. For example, the system may comprise a camera module 140, an image signal processor 110, and an optical image stabilization (OIS) system 150.

The camera module 140 captures images and/or video. The camera module 140 may comprise various devices and/or systems to focus light, capture image data, perform auto focus and/or image stabilization functions. For example, the camera module 140 may comprise a lens 130, an image sensor 200, and an actuator 220.

The image sensor 200 may comprise any suitable system or device for capturing image data. For example, the image sensor 200 may comprise a pixel array 700 (FIG. 7A) to detect and convey image data corresponding to an image by converting the variable attenuation of light waves (as they pass through or reflect off objects) into electrical signals. The pixel array 700 may comprise a plurality of pixels 705 (FIG. 7A) arranged to form rows and columns, and the pixel array 700 may contain any number of rows and columns, for example, hundreds or thousands of rows and columns. The location of each pixel 705 within the pixel array 700 may be defined or otherwise identified by a row number and a column number within the pixel array 700. Each pixel 705 may comprise any suitable type of photosensor, such as a photogate, a photodiode, and the like, to detect light and convert the detected light into a charge. The image sensor 200 may be implemented in conjunction with any appropriate technology, such as active pixel sensors in complementary metal-oxide-semiconductors (CMOS) and charge-coupled devices (CCD).

The lens 130 may comprise any suitable lens for focusing light on the image sensor 200 and may be positioned adjacent to a sensing surface of the image sensor 200. The lens 130 may be adjustable or fixed relative to the image sensor 200. For example, in an exemplary embodiment, the lens 130 may be coupled to the actuator 220 and configured to move along various axes, such as an x-axis and a y-axis (e.g., a positive x-direction, a negative x-direction, a positive y-direction, and a negative y-direction).

The device 100 may further comprise a diaphragm 145 with an adjustable aperture 155 to control an amount of light that enters the camera module 140. The diaphragm 145 may control a diameter D, a corresponding area (i.e., area=($\frac{1}{4}$)$\pi D^2$), and a corresponding f-number of the aperture 155. As such, the diameter D (or area) of the aperture 155 may increase or decrease according to the f-number. In general, as the f-number increases, the diameter D of the aperture 155 decreases. In various embodiments, the diaphragm 145 may be integrated in the camera module 140. In alternative embodiments, however, the diaphragm 145 may be arranged adjacent to the camera module 140. The diaphragm 145 may comprise any suitable device or system having an adjustable aperture.

The actuator 220 may be configured to move the lens 130 along various axes to improve image quality. The actuator 220 may comprise any suitable device or system capable of moving and/or repositioning the lens 130 in response to a signal. The actuator 220 may be configured to move the lens 130 for the purpose of performing auto-focus functions, counteracting involuntary movements, such as hand jitter or shaking, and the like. For example, in one embodiment, the actuator 220 may comprise a voice coil motor (VCM) responsive to a driver signal DS from a driver 210 making up at least part of the OIS system 150. The actuator 220 may be limited in the amount of movement it can perform, whether self-limiting or due to the design of the system. For example, the camera module 140 may comprise a housing (not shown), with sidewalls, to house the lens 130, the actuator 220, and the image sensor 200. In general, the lens 130 is positioned perpendicular to the sidewalls, such that the sidewalls surround the lens 130, and the housing is larger than a diameter of the lens 130. As such, the range of movement by the actuator 220 on the lens 130 may be limited by the distance from an outer perimeter of the lens 130 to the sidewalls.

The camera module 140 may operate in conjunction with the OIS system 150 to focus an image on the image sensor 200, reposition the lens 130 to capture relevant regions of a scene and/or object, to counteract involuntary movements of the device 100, and the like. The OIS system 150 may be configured to carry out and/or facilitate various functions, such as to detect angular velocity, facilitate auto focus, and/or facilitate image stabilization functions. The OIS system 150 may comprise any suitable device or system to detect movement of the device 100 and/or any suitable device or system to counteract the detected movement. For example, the OIS system 105 may comprise the driver 210 and a gyro sensor 215.

The gyro sensor 215 detects the angular velocity (e.g., movement caused by shaking/vibrations) of the device 100 and transmits a gyro signal, representing the angular velocity of the device 100 to the OIS system 150. The gyro sensor 215 may detect the angular velocity due to the Coriolis force that is applied to a vibrating element. This motion produces a potential difference as a result of sensing the angular velocity. The gyro sensor 215 may comprise any suitable sensor system or device configured to detect vibrations produced by external factors and transmit the vibration data as an electrical signal to the OIS system 150. The gyro sensor 215 may be selected according to a particular application and may be selected according to various specifications, such as sensing range, output type, supply current, operating temperature and the like.

The driver 210 controls and supplies power to various devices within the system. For example, the driver 210 may supply power to the actuator 220. The driver 210 supplies power to the actuator 220, and a magnitude of movement of the actuator 220 is proportion to the amount of power supplied by the driver 210. The driver 210 may receive and respond to various signals indicating the amount of power to be applied to the actuator 220. The driver 210 may comprise any suitable control device or system capable of providing energy to the actuator 220.

The driver 210 may receive and respond to signals from the gyro sensor 215 and provide the appropriate power to the actuator 220 to achieve a desired lens 130 position. For example, the image signal processor 110 may operate in conjunction with the OIS system 150 and other sensors, such as a hall sensor (not shown), to perform auto-focus functions. In this case, the driver 210 may receive an auto-focus signal AF from the image signal processor 110 to facilitate auto-focus functions.

The driver 210 may also receive and respond to a lens shift signal LS from the image signal processor 110 to facilitate lens shifting functions to reduce or correct vignetting and/or out-of-focus images. The lens shift signal LS may comprise instructions representing both a magnitude and direction. The driver 210 may then communicate the instructions to the actuator 220 by providing an appropriate amount of power. In various embodiments, the driver 210 may be integrated with the image signal processor 110. In alternative embodiments, however, the driver 210 may be integrated with the camera module 140.

In various embodiments, the image signal processor 110 may perform various digital signal processing functions, such as color interpolation, color correction, auto-focus, exposure adjustment, noise reduction, white balance adjustment, compression, and the like, to produce a final output image. The image signal processor 110 may comprise any number of semiconductor devices, such as transistors, capacitors, and the like, for performing calculations, transmitting and receiving image pixel data, and a storage unit, such as random-access memory, non-volatile memory or any other memory device suitable for the particular application, for storing pixel data. In various embodiments, the image signal processor 110 may be implemented with a programmable logic device, such as a field programmable gate array (FPGA) or any other device with reconfigurable digital circuits. In other embodiments, the image signal processor 240 may be implemented in hardware using non-programmable devices. In alternative embodiments, the image signal processor 110 may be formed partially or entirely within an integrated circuit in silicon using any suitable complementary metal-oxide semiconductor (CMOS) techniques or fabrication processes, in an ASIC (application-specific integrated circuit), using a processor and memory system, or using another suitable implementation.

The image signal processor 110 may transmit the output image to an output device, such as a display screen or a memory component, for storing and/or viewing the image data. For example, the output image may be transmitted to the I/O device 115. The output device may receive digital image data, such as video data, image data, frame data, and/or gain information from the image signal processor 110. In various embodiments, the output device may comprise an external device, such as a computer display, memory card, or some other external unit.

Figure 7A:
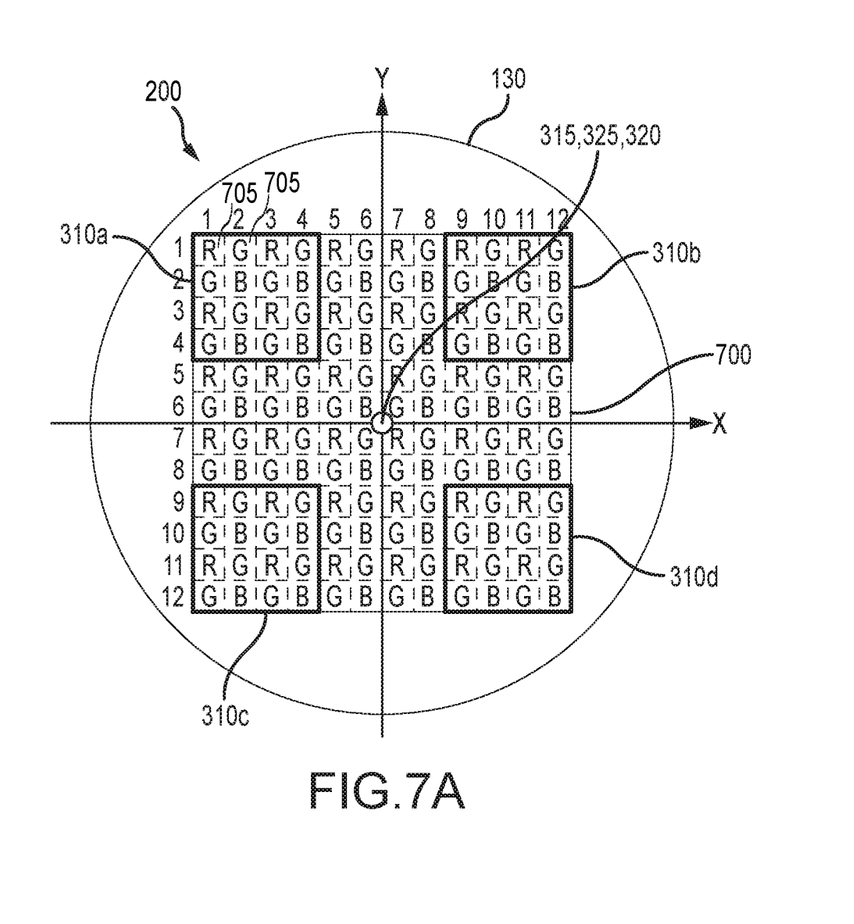
FIGS. 7A-E representatively illustrate lens positions and corresponding pixel locations in accordance with an exemplary embodiment of the present technology.

The image signal processor 110 may further perform pixel correction on an image. For example, the image signal processor 110 may comprise a pixel correction module 205 configured to substitute the pixel data from one image with the pixel data from a different image. The pixel correction module 205 may comprise any suitable device or system capable of substituting the pixel data from one image with the pixel data from one or more different images. For example, in an exemplary embodiment, the pixel correction module 205 may substitute pixel data from a first image with pixel data from a second image and a third image. The substituted pixel data may be selected according to a particular region on the image sensor 200, for example according to the location of one or more pixels 705, given by the row and column number of each pixel 705.

In various embodiments, the methods and apparatus may utilize various information about the device 100 and/or device settings, such as the type and/or size of the lens 130, the f-number of the diaphragm 145, which relates to the diameter D of the aperture 155, and/or the distance d between the lens 130 and the image sensor 200, in conjunction with the pixel correction module 205 to perform vignette and out-of-focus correction. In various embodiments, the device 100 captures a series of images with the lens 130 in a different position for each image capture. The pixel data from each image capture is then reconfigured to produce a corrected image. In various embodiments, the corrected image exhibits little or no vignetting and/or out-of-focus areas.

In operation, and referring to FIGS. 2 and 3A, in response to the driver signal DS from the driver 210 the actuator 220 may position a center point 320 of the lens 130 along a center axis 315 prior to a first image 305a capture. In various embodiments, during the first image 305a capture, the center point 320 of the lens 130 and a center point 325 of the image sensor 135 are aligned with the center axis 315. The pixel data from the first image 305a may be transmitted to the image signal processor 110. The first image 305a of an object 300 (or scene) may comprise a plurality of regions 310 that exhibit vignetting and/or may be out-of-focus. The regions 310 may correspond to various portions of the object 300 and various locations of the pixel array 700, which correspond to one or more sets of pixel data. For example, the first image 305 may comprise a first region 310a, a second region 310b, a third region 310c, and a fourth region 310d.

The actuator 220 may then receive another driver signal DS from the driver 210 to reposition the lens 130 to a new desired position for a subsequent image capture. For example, and referring to FIG. 3B, the actuator 220 may move the lens 130 such that the center point 320 of the lens 130 is no longer aligned with the center axis 315 prior to a subsequent image 305b capture. Moving the center point 320 of the lens 130 away from the center axis 315 for the subsequent image 305b capture results in at least a portion of the object 300 being better reflected (receiving more light) on the image sensor 135 as compared to the same portion in the first image 305a capture. Thus, the plurality of regions 310 in the first image 305a that may be compromised due to vignetting and/or may be out-of-focus can be recaptured with significantly less vignetting and out-of-focus areas in the subsequent image 305b. For example, the third region 310c and the fourth region 310d, will therefore appear to be closer to the center of the subsequent image 305b relative to the first image 305a and have less vignetting or other optical issues. The device 100 may capture the first image 305a with the lens 130 in any position relative to the image sensor 135 thereby not requiring that the center point 320 of the lens 130 be aligned with the center point 325 of the image sensor 135.

Figure 4A:
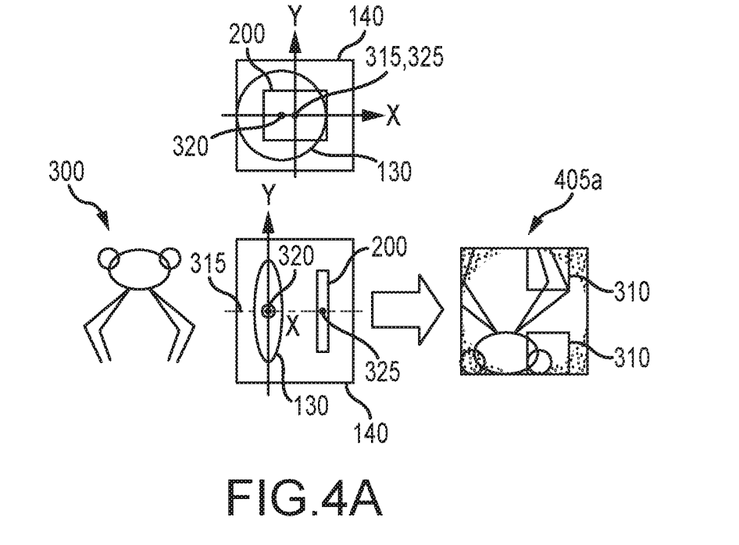
FIGS. 4A-B representatively illustrates lens positions and resulting image captures with vignetting in accordance with an exemplary embodiment of the present technology.
Figure 4B:
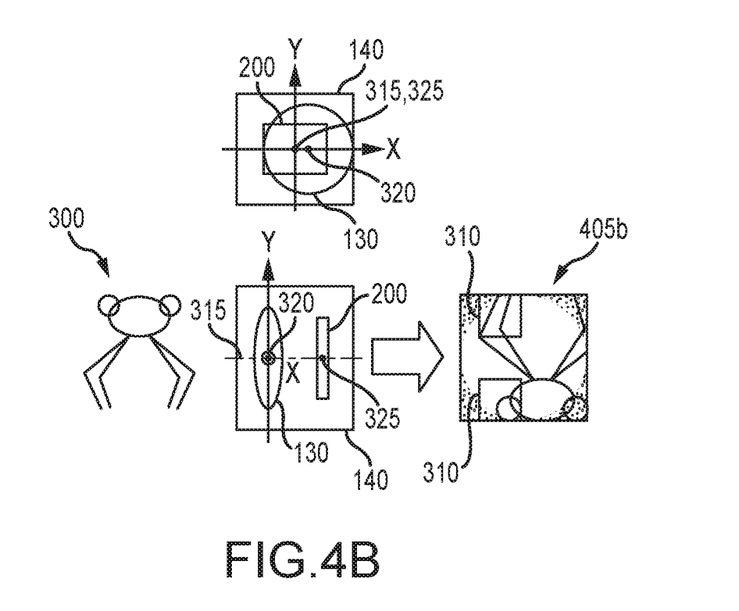

The device 100 may be configured to capture any number of a series of images, with the lens 130 in a different position for each image capture. For example, and referring to FIGS. 3A and 4A-B, after the first image 305a capture, device 100 may capture a second image 405a with the center point 320 of the lens 130 moved along the negative x-direction relative to the center axis 315 and a third image 405b with the center point 320 of the lens 130 moved along the positive x-direction relative to the center axis 315. Repositioning the lens 130 for the second image 405a capture focuses a different part of the object 300 and/or scene, directs light onto a different region of the image sensor 135, and effectively shifts some regions 310 to the center region of the second image 405a, and repositioning the lens 130 in the third capture 405b effectively shifts different regions 310 to the center of the third image 405b. As such, the regions 310 from the first image 305a that are compromised due to vignettes and/or are out-of-focus are shifted in the second and third images 405a, 405b and exhibit fewer or no vignettes compared to the first image 305a.

Figure 5A:
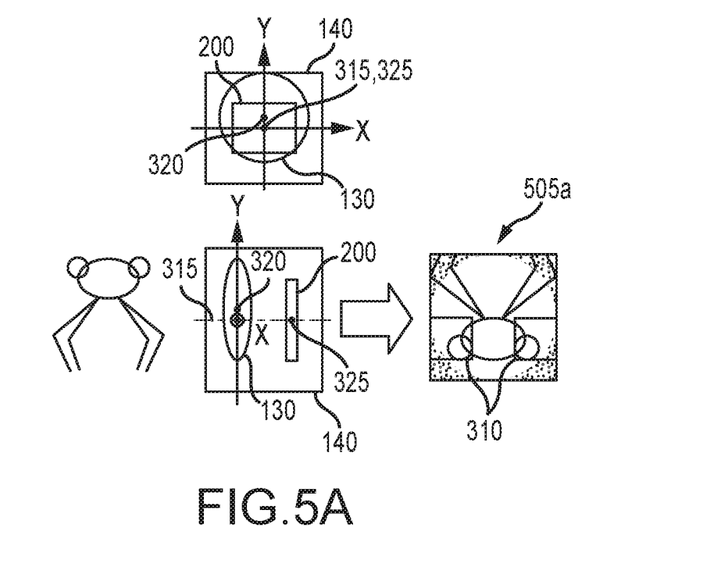
FIGS. 5A-5B representatively illustrate lens positions and resulting image captures with vignetting in accordance with an exemplary embodiment of the present technology.
Figure 5B:
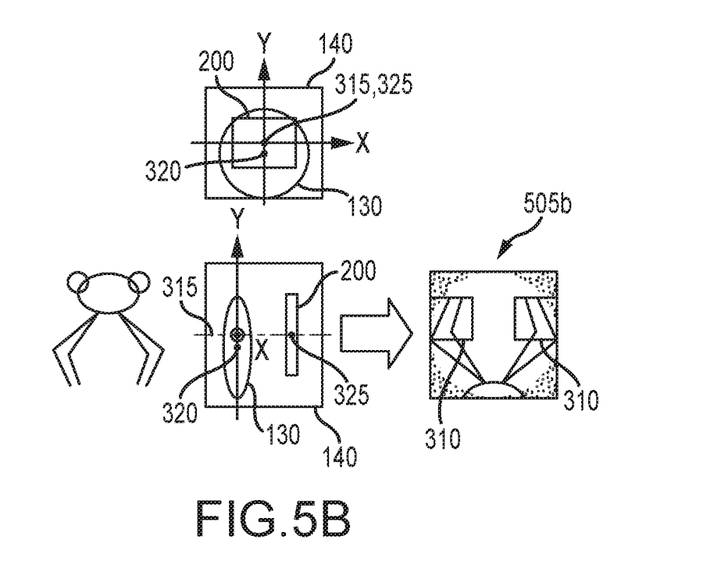

Similarly, and referring to FIGS. 3A and 5A-5B, after the first image 305a capture, device 100 may capture a second image 505a with the center point 320 of the lens 130 moved along the positive y-direction relative to the center axis 315 and a third image 505b with the center point 320 of the lens 130 moved along the negative y-direction relative to the center axis 315.

Figure 6A:
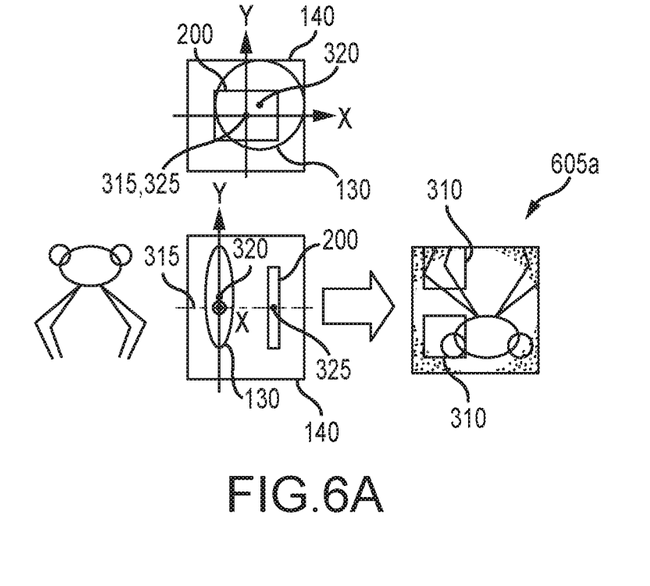
FIGS. 6A-6B representatively illustrate lens positions and resulting image captures with vignetting in accordance with an exemplary embodiment of the present technology.
Figure 6B:
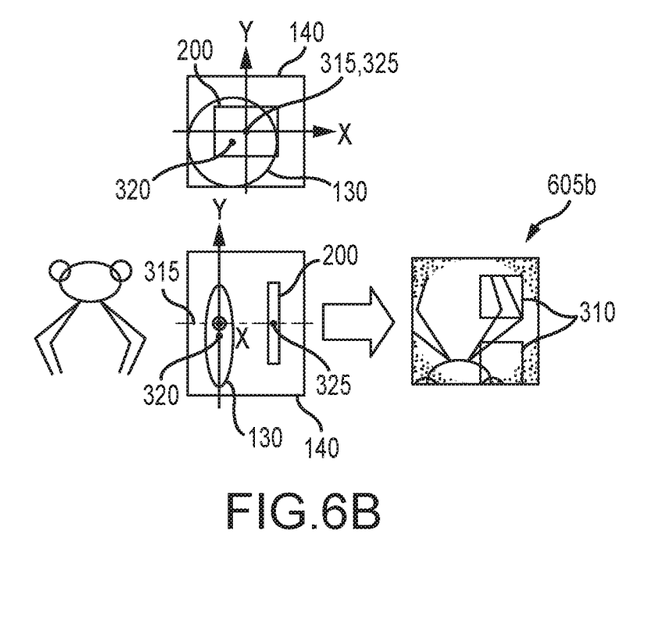

Similarly, and referring to FIGS. 3A and 6A-6B, after the first image 305a capture, device 100 may capture a second image 605a with the center point 320 of the lens 130 moved along the positive x- and y-direction relative to the center axis 315 and a third image 605b with the center point 320 of the lens 130 moved along the negative x- and y-direction relative to the center axis 315.

In various embodiments, a time delay may exist between image captures. While the delay may be, in part, due to signal delays, the time delay between image captures may also be based on the amount (i.e., distance) that the lens must be moved (i.e., shifted) to reach a new target position. Factors that may contribute to the time delay may include the diameter of the lens 130, the size of the pixel array 700 (FIG. 7A), the limitations of the actuator 220, and the like. For example, the time delay between image captures may be approximately 10 milliseconds.

After the device 100 captures an image, pixel data from the capture may be transmitted to the image signal processor 110 for processing. The pixel correction module 205 (FIG. 2) may be configured to selectively remove pixel data from one image and replace it with pixel data from a different image. In this way the pixel data corresponding to the regions 310 that exhibit vignetting and/or other optical defects may be removed and replaced with pixel data that does not exhibit vignetting and/or other optical defects.

For example, and referring to FIGS. 7A-7E, in a main image (FIG. 7A), each region 310 may correspond to a set of pixels 705 (where each set of pixels corresponds to a set of pixel data). The first region 310a may correspond to pixels 705 in columns 1:4 and rows 1:4, the second region 310b may correspond to pixels 705 in columns 9:12 and rows 1:4, the third region 310c may correspond to pixels 705 in columns 1:4 and rows 9:12, and the fourth region 310d may correspond to pixels 705 in columns 9:12 and rows 9:12. The image signal processor 110 may save the pixel data (i.e., main image data) for each pixel 705 according to the location (row number and column number) of each pixel 705.

In subsequent images, the actuator 220 repositions the lens 130 to the new target position to recapture portions of the object 300 that may be compromised in the main image due to vignetting or other optical defects. In subsequent images, each region 310 may correspond to a set of pixels 705 that are different from the sets in the main image. For example, for a first subsequent image (FIG. 7B), the lens 130 is moved along the positive y-axis relative to the center axis 315, which moves the center point 320 of the lens 130 upward relative to the image sensor 200. Now, the third region 310c corresponds to pixels 705 in columns 1:4 and rows 7:10, and the fourth region 310d corresponds to pixels 705 in columns 9:12 and rows 7:10. Similarly, for a second subsequent image (FIG. 7C), the lens 130 is moved along the negative y-axis relative to the center axis 315, which moves the center point 320 of the lens 130 upward relative to the image sensor 200. Now, the first region 310a corresponds to pixels 705 in columns 1:4 and rows 3:6, and the second region 310b corresponds to pixels 705 in columns 9:12 and rows 3:6. The pixel correction module 205 may save each subsequent image and extract a relevant portion of the pixel data to be used to form the corrected image. The relevant portion may be defined or identified as those pixels 705 corresponding to the various regions 310.

Figure 7B:
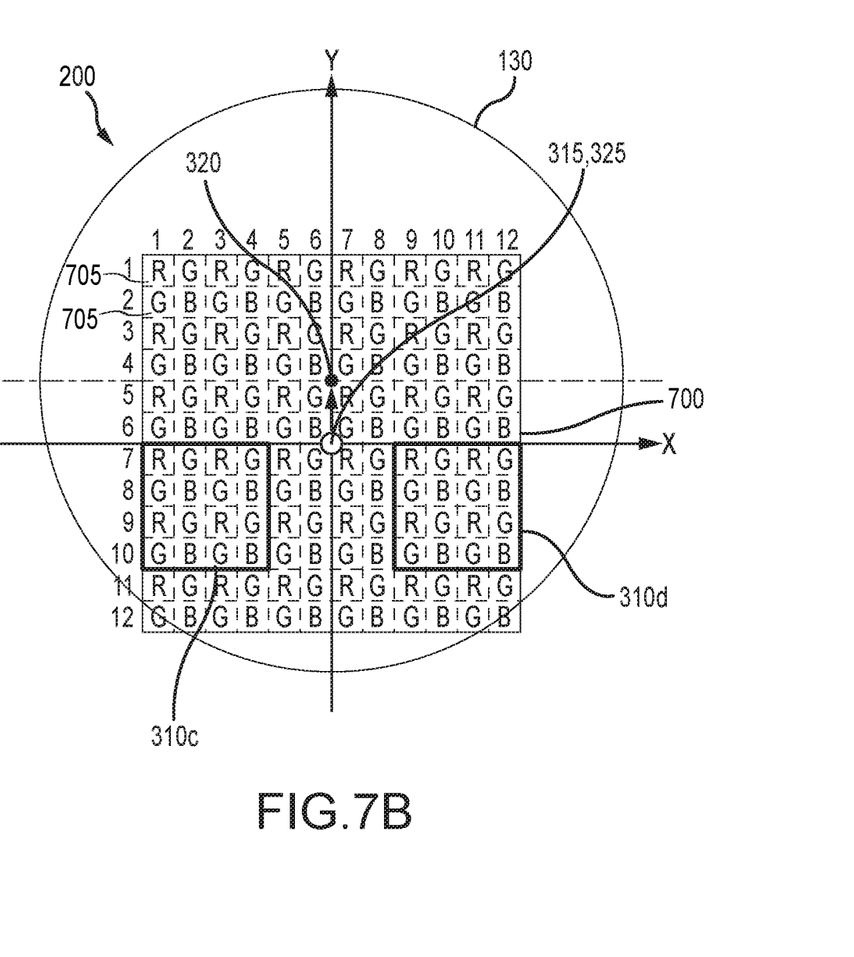
Figure 7C:
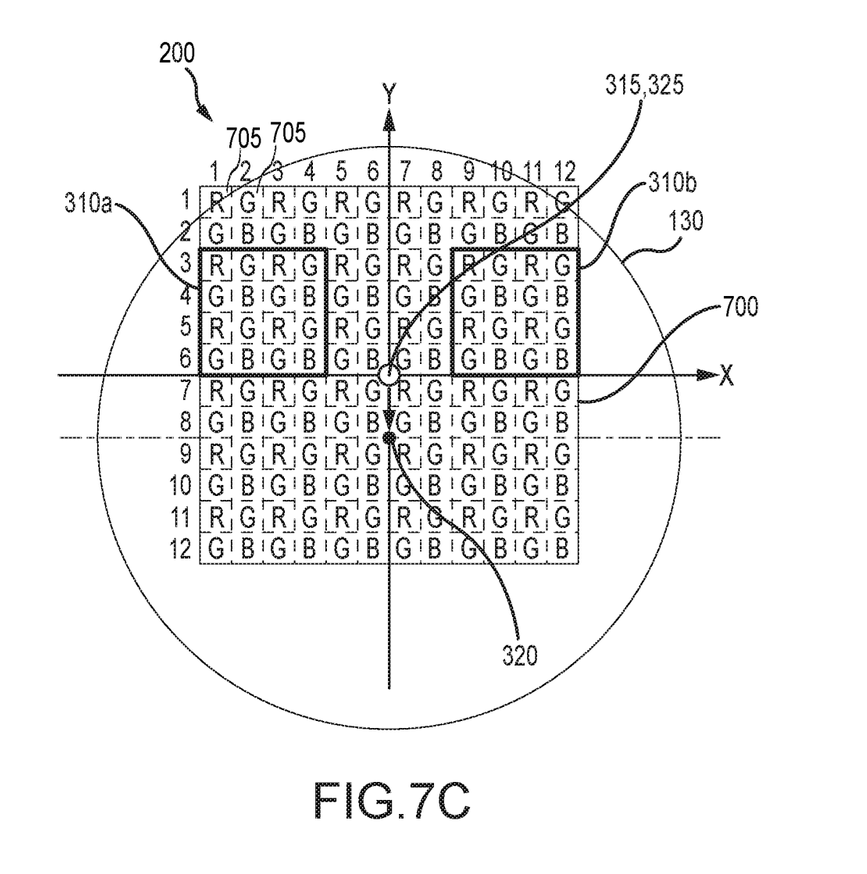
Figure 7D:
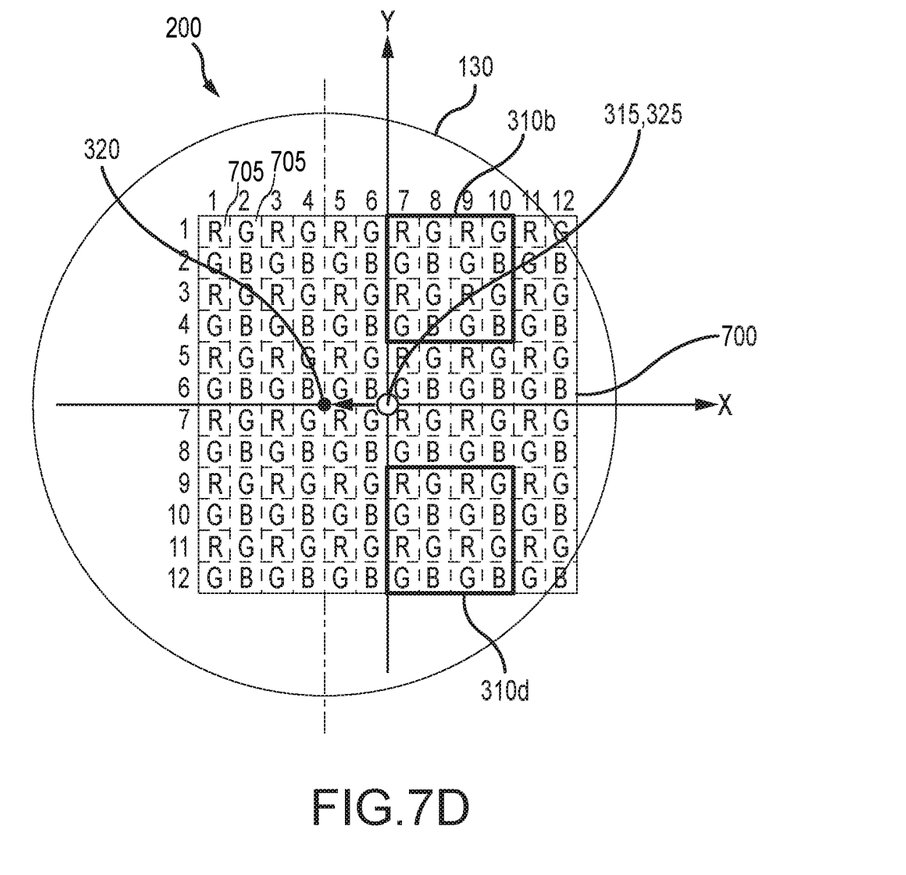

The pixel correction module 205 may remove the set of pixel data corresponding to the regions 310 from the main image and replace the pixel data with some or all of the pixel data from the subsequent images (i.e., sub-image data). For example, the pixel data corresponding to the first region 310a in the main image may be replaced with the pixel data corresponding to the first region 310a in the second subsequent image. The pixel correction module 205 may then remove and replace any remaining regions 310 that exhibit vignetting and/or other optical defects to form the corrected image. For example, the pixel correction module 205 may remove and replace the pixel data corresponding to the second, third, fourth regions 310b, 310c, 310d in the same manner as described above.

Figure 7E:
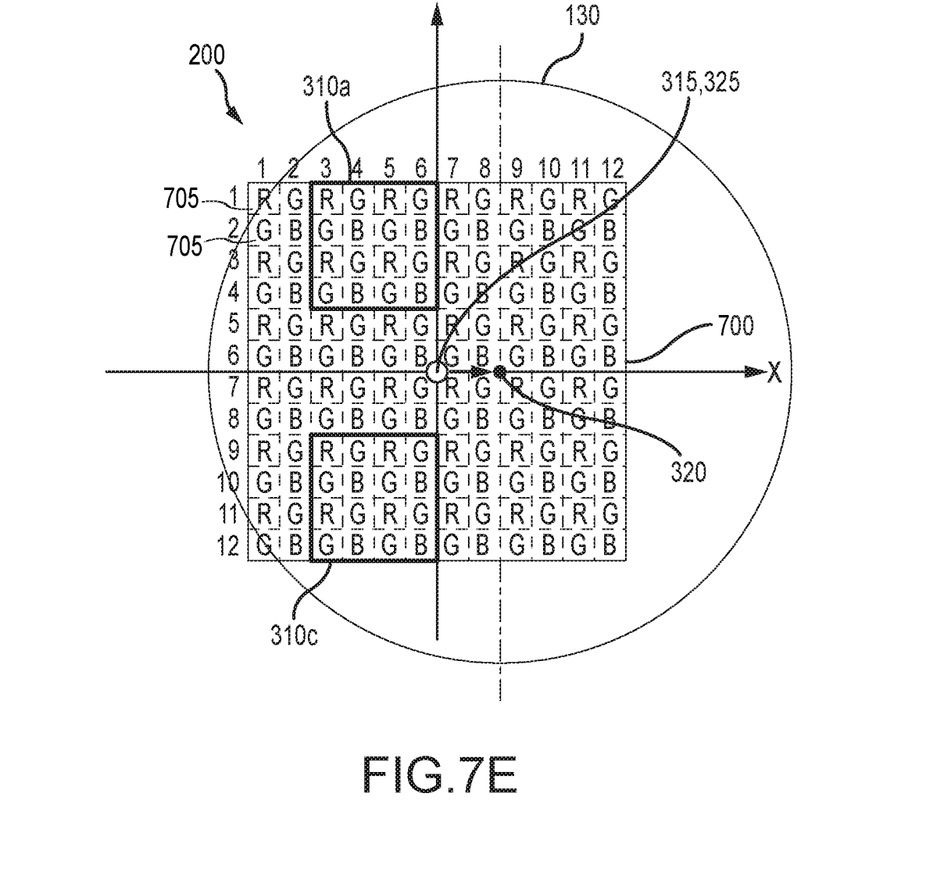

In various embodiments, the actuator 220 may move the lens 130 along the x-axis. In this case, the subsequent images may recapture the second and fourth regions 310b, 310d (FIG. 7D) and the first and third regions 310a, 310c (FIG. 7E). The pixel correction module 205 may remove and replace the pixel data from the main image (FIG. 7A) with the pixel data from the subsequent images in the same manner as described above.

Further, the actuator 220 may move the lens 130 along both the x- and y-axis to portions of the object 300 that may be compromised in the main image due to vignetting or other optical defects. The pixel correction module 205 may remove and replace the pixel data from the main image (FIG. 7A) with the pixel data from the subsequent images in the same manner as described above.

In various embodiments, the actuator 220 may reposition the lens 130 by a magnitude that is related to the diameter D of the aperture 155, the type of lens 130, and the distance d between the image sensor 200 and the lens 130. The image signal processor 110, the OIS system 210, and/or the actuator 220 may control the particular direction of movement of the lens 130 for each subsequent image after the main image.

In various embodiments, the image signal processor 110 may save at least a portion of the main image data and the sub-image data to a memory or storage device. The image signal processor 110 may be configured to extract the relevant sub-image data (i.e., the relevant pixel data), to remove portions of the main image data and replace it with the relevant portions of the sub-image data. After the image signal processor 110 selectively removes and replaces (substitutes) the main image data with the relevant sub-image data to form the corrected image, the image signal processor 110 may purge the sub-image data.

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. An imaging apparatus with an aperture and capable of capturing a plurality of images, comprising:
    a lens capable of moving from a first position to a new position;
    an image sensor positioned substantially parallel to the lens, wherein: the image sensor and the lens are separated by a distance; and the image sensor generates a first image comprising a first total number of pixel data and a second image comprising a second total number of pixel data, each image having a dimension R×C and comprising a plurality of corners;
    an actuator coupled to the lens and capable of repositioning the lens from the first position to the new position; wherein:
        the first position and the new position are in a same plane that is parallel to the image sensor; and
        the image sensor remains in a fixed position relative to the lens and the distance between the image sensor and the lens is maintained; and
    an image signal processor coupled to the image sensor and configured to selectively remove a first set of pixel data from the first total number of pixel data and replace the first set of pixel data with a second set of pixel data from the second total number of pixel data;
    wherein:
        the first set of pixel data is located in one outer corner from the plurality of outer corners of the first image; and
        the second set of pixel data is located in a non-corner area of the second image, the non-corner area defined as an area offset from the plurality of outer corners of the second image.

2. The imaging apparatus according to claim 1, wherein:
    the image sensor comprises a first center point;
    the lens comprises a second center point; and
    the imaging apparatus captures:
        at least one image wherein the first and second center points are aligned along a center axis; and
        at least one image wherein the second center point is positioned away from the center axis.

3. The imaging apparatus according to claim 1, wherein the new position is determined according to a diameter of the lens and the distance.

4. The imaging apparatus according to claim 3, wherein the new position is also determined according to an area of the aperture.

5. The imaging apparatus according to claim 1, wherein:
    the imaging apparatus captures the first image and the second image in series; and
    the first set of pixel data corresponds to a region in the first image that exhibits vignetting.

6. The imaging apparatus according to claim 5, wherein the image sensor comprises rows and columns of pixels, and the second set of pixel data corresponds to a set of pixels based on a location of the lens relative to the image sensor.

7. The imaging apparatus according to claim 5, wherein:
    the image sensor comprises a first center point;
    the lens comprises a second center point;
    the first and second center points are aligned along a center axis when the imaging apparatus captures the first image; and
    the second center point is positioned away from the center axis when the imaging apparatus captures the second image.

8. A method for correcting image vignettes, comprising:
    capturing main image data with an imaging apparatus, comprising:
        an aperture;
        a lens having a first center point;
        an image sensor having a second center point; and
        an actuator coupled to the lens and capable of positioning the lens;
    saving at least a portion of the main image data to a storage device;
    repositioning the lens to a new position along a plane parallel to the image sensor;
    capturing sub-image data with the imaging apparatus;
    saving at least a portion of the sub-image data to the storage device; and
    substituting a subset of the main image data with a subset of the sub-image data to form a corrected image;
    wherein:
        the main image data forms a first image comprising a first plurality of corners;
        the sub-image data forms a second image comprising a second plurality of corners;
        the subset of the main image data is located in one outer corner from the first plurality of outer corners of the first image; and
        the subset of the sub-image data is located in a non-corner area of the second image, the non-corner area defined as an area offset from the second plurality of outer corners of the second image.

9. The method for correcting image vignettes according to claim 8, wherein repositioning the lens to the new position is based on at least one of:
    a diameter of the lens;
    a distance separating the lens and the image sensor; and
    an area of the aperture.

10. The method for correcting image vignettes according to claim 8, wherein the first and second images exhibit vignetting and the corrected image is substantially free of vignetting.

11. The method for correcting image vignettes according to claim 8, further comprising:
    aligning, the first center point and the second center point along a common axis when capturing the main image data.

12. The method for correcting image vignettes according to claim 11, wherein repositioning the lens comprises moving the first center point away from the common axis.

13. An imaging system capable of photographing an object, comprising:
- a camera module, comprising:
  - a lens;
  - an image sensor positioned substantially parallel to the lens, wherein the image sensor and the lens are separated by a distance;
  - an actuator coupled to and capable of repositioning the lens to a new position along a plane that is parallel to the image sensor;
  - wherein the camera module captures a first image comprising main image data and a second image comprising sub-image data;
- a driver circuit communicatively coupled to the actuator; and
- a image signal processor coupled to the camera module and the driver circuit,
  - wherein the image signal processor:
    - transmits a signal to the actuator via the driver circuit, wherein the signal represents a magnitude and a direction for repositioning the lens;
    - stores the main image data and sub-image data; and
    - substitutes a first set of the main image data with a second set of the sub-image data to form a corrected image;
- wherein:
  - the first image comprises a first plurality of corners;
  - the second image comprises a second plurality of corners;
  - the first set of the main pixel data is located in one outer corner from the plurality of outer corners of the first image; and
  - the second set of pixel data is located in a non-corner area of the second image, the non-corner area defined as an area offset from the second plurality of outer corners of the second image.

14. The imaging system according to claim 13, further comprising an aperture, and wherein the new position is determined according to an area of the aperture.

15. The imaging system according to claim 13, wherein:
the camera module captures the first image and the second image consecutively.

16. The imaging system according to claim 13, wherein:
the image sensor comprises a plurality of pixels;
the first set of the main image data corresponds to a first set of pixels from the plurality of pixels;
the first set of main image data corresponds to a region in a first image capture that exhibits vignetting; and
the second set of the sub-image data corresponds to a second set of pixels from the plurality of pixels.

17. The imaging system according to claim 13, wherein the lens focuses a first region of the object in the first image, and the lens focuses a second region of the object in the second image.

18. The imaging system according to claim 13, wherein the new position is determined according to a diameter of the lens and the distance.

19. The imaging system according to claim 18, wherein:
the image sensor comprises a first center point;
the lens comprises a second center point;
the first and second center points are aligned along a center axis when the imaging system captures the main image data; and
the second center point is positioned away from the center axis when the imaging system captures the sub-image data.

* * * * *